United States Patent
Kawamoto

(10) Patent No.: US 8,666,624 B2
(45) Date of Patent: Mar. 4, 2014

(54) CLUTCH CONTROL DEVICE AND CLUTCH CONTROL METHOD

(75) Inventor: Yoshinobu Kawamoto, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 754 days.

(21) Appl. No.: 12/531,125

(22) PCT Filed: Mar. 21, 2008

(86) PCT No.: PCT/JP2008/055985
§ 371 (c)(1),
(2), (4) Date: Sep. 14, 2009

(87) PCT Pub. No.: WO2008/114890
PCT Pub. Date: Sep. 25, 2008

(65) Prior Publication Data
US 2010/0250079 A1    Sep. 30, 2010

(30) Foreign Application Priority Data

Mar. 20, 2007    (JP) .................................. 2007-072931

(51) Int. Cl.
*G06F 19/00*    (2011.01)
(52) U.S. Cl.
USPC ............... 701/68; 701/67; 477/166; 477/168; 477/180
(58) Field of Classification Search
USPC ............... 477/166–181, 156, 158; 701/67, 68
See application file for complete search history.

(56) References Cited

U.S. PATENT DOCUMENTS

| 4,943,920 A | * | 7/1990 | Hiramatsu et al. ............... 701/51 |
| 5,004,086 A | * | 4/1991 | Petzold et al. ............. 192/85.57 |
| 5,685,803 A | * | 11/1997 | Furukawa et al. ............ 477/158 |
| 5,741,201 A | * | 4/1998 | Tsutsui et al. ................ 477/116 |
| 6,094,976 A | * | 8/2000 | Hayashi et al. ............ 73/115.04 |
| 6,117,048 A | * | 9/2000 | Toyama ........................ 477/180 |
| 6,260,934 B1 | * | 7/2001 | Lee ............................... 303/192 |

(Continued)

FOREIGN PATENT DOCUMENTS

| EP | 1 482 197 A1 | 12/2004 |
| EP | 1 593 870 A1 | 11/2005 |

(Continued)

OTHER PUBLICATIONS

Glielmo et al, Gearshift control for automated manual transmissions, Feb. 2006, IEEE, vol. 11, No. 1.*

*Primary Examiner* — Thomas Black
*Assistant Examiner* — Sara Lewandroski
(74) *Attorney, Agent, or Firm* — Foley & Lardner LLP

(57) ABSTRACT

A clutch control device that controls a clutch by driving a piston using a working fluid, having: stroke start determining means (S1) for determining that a stroke of the piston has started and detecting a stroke start oil pressure at that time; stroke end determining means (S4) for determining that the stroke of the piston is complete and detecting a stroke end oil pressure at that time; stroke end range estimating means (S3) for estimating a range of the stroke end oil pressure from the stroke start oil pressure detected by the stroke start determining means; and learning means (S5, S6) for learning the stroke end oil pressure detected by the stroke end determining means when the stroke end oil pressure is within the estimated range of the stroke end oil pressure. Learning precision of the stroke end oil pressure can be improved.

10 Claims, 4 Drawing Sheets

(56) References Cited

U.S. PATENT DOCUMENTS

| | | | |
|---|---|---|---|
| 6,276,197 B1 * | 8/2001 | Hayashi et al. | 73/115.04 |
| 6,519,521 B2 * | 2/2003 | Takatori et al. | 701/55 |
| 7,445,107 B2 * | 11/2008 | Kawamoto et al. | 192/85.63 |
| 7,568,991 B2 * | 8/2009 | Inuta | 475/120 |
| 7,815,545 B2 * | 10/2010 | Nakashima et al. | 477/138 |
| 7,909,729 B2 * | 3/2011 | Tanaka et al. | 477/8 |
| 2004/0188218 A1 | 9/2004 | Berger et al. | |
| 2004/0229728 A1 * | 11/2004 | Oshima et al. | 477/176 |
| 2006/0144667 A1 | 7/2006 | Schweizer et al. | |
| 2006/0154781 A1 | 7/2006 | Petzold et al. | |
| 2006/0223670 A1 * | 10/2006 | Nishikawa et al. | 477/168 |
| 2006/0272919 A1 | 12/2006 | Kawamoto et al. | |

FOREIGN PATENT DOCUMENTS

| | | |
|---|---|---|
| EP | 1 729 036 A2 | 12/2006 |
| JP | 63-019425 A | 1/1988 |
| JP | 2006-336806 A | 12/2006 |

* cited by examiner

CLUTCH CONTROL DEVICE AND CLUTCH CONTROL METHOD

TECHNICAL FIELD

This invention relates to a clutch control device and a clutch control method.

BACKGROUND OF THE INVENTION

JP2006-336806A, published by the Japan Patent Office in 2006, relates to a clutch control device and a clutch control method, and discloses a technique with which an ineffective stroke of a clutch piston can be learned accurately without engaging a clutch plate.

This clutch control device applies an auxiliary fluid pressure signal to a fluid pressure signal defining the magnitude of a fluid pressure of a working fluid, and then determines and learns a piston control oil pressure (command oil pressure) at the start and end of a piston stroke on the basis of variation in the magnitude of an actual fluid pressure of the working fluid generated by the auxiliary fluid pressure signal.

DISCLOSURE OF THE INVENTION

However, in this prior art, when the oil pressure at the end of the clutch stroke takes an unfeasible abnormal value, this value is learned as is, and hence there is room for improvement in the learning precision.

This invention has been invented to solve the problem described above, and an object thereof is to learn a control oil pressure of a piston at the start and end of a stroke with a high degree of accuracy.

According to this invention, a clutch control device that controls a clutch by driving a piston using a working fluid, comprises: stroke start determining means for determining that a stroke of the piston has started and detecting a stroke start oil pressure at that time; stroke end determining means for determining that the stroke of the piston is complete and detecting a stroke end oil pressure at that time; stroke end range estimating means for estimating a range of the stroke end oil pressure from the stroke start oil pressure detected by the stroke start determining means; and learning means for learning the stroke end oil pressure detected by the stroke end determining means when the stroke end oil pressure is within the estimated range of the stroke end oil pressure.

Further, according to this invention, a clutch control device that controls a clutch by driving a piston using a working fluid, comprises: stroke start determining means for determining that a stroke of the piston has started and detecting a stroke start oil pressure at that time; stroke end determining means for determining that the stroke of the piston is complete and detecting a stroke end oil pressure at that time; clutch stroke width calculating means for calculating a clutch stroke width from the stroke start oil pressure and the stroke end oil pressure; and learning means for learning the stroke end oil pressure detected by the stroke end determining means when the clutch stroke width is within a predetermined range.

According to this invention, the range of the stroke end oil pressure is estimated using the stroke start oil pressure as a reference, and when the stroke end oil pressure is within the estimated range of the stroke end oil pressure, the stroke end oil pressure is learned. Hence, the learning precision of the stroke end oil pressure can be improved. Moreover, learning is performed when the clutch stroke width satisfies a predetermined condition, and therefore the learning precision can be improved.

BEST MODES FOR CARRYING OUT THE INVENTION

Figure 1:
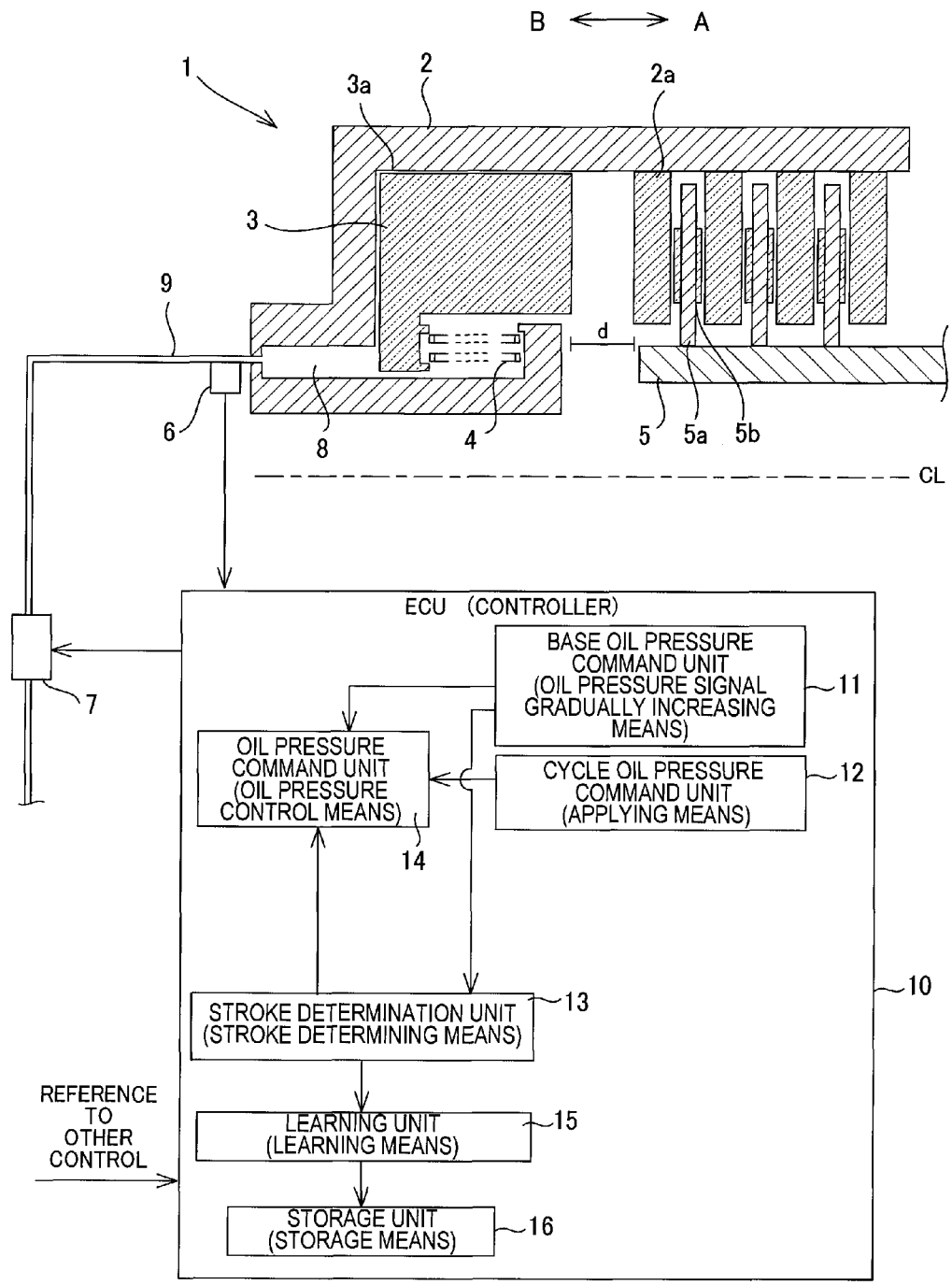
FIG. 1 is a schematic diagram showing a clutch control device according to this invention.

A clutch control device according to a first embodiment is applied to a friction clutch mechanism such as that shown in FIG. 1, which includes a multiple disc clutch that is connected and disconnected by driving a piston using oil pressure. The basic constitution of the clutch control device may be identical to that of the device described in JP2006-336806A, published by the Japan Patent Office in 2006, for example.

The friction clutch mechanism 1 is of a multiplate wet clutch type which transmits or interrupts transmission of a driving force input from an engine (internal combustion engine), not shown, between a hollow input shaft 2 and a hollow output shaft 5. The friction clutch mechanism 1 is constituted by a plurality of drive plates 2a, a plurality of driven plates 5a, a friction material 5b, a clutch piston 3, and a return spring 4. It should be noted that in FIG. 1, only a cross-section on an upper half of a rotary axis CL is shown.

The plurality of drive plates (first rotary elements) 2a are fitted to be capable of sliding in the direction of the rotary axis CL on an inner peripheral surface of the input shaft 2. The drive plates 2a rotate integrally with the input shaft 2 about the rotary axis CL as a central axis. Further, the driving force transmitted from the input shaft 2 is transmitted to the output shaft 5 side via the drive plates 2a.

Meanwhile, the driven plates (second rotary elements) 5a are provided to stand parallel to the drive plates 2a. The plurality of driven plates 5a are fitted to be capable of sliding in the direction of the rotary axis CL on an outer peripheral surface of the output shaft 5, and rotate integrally with the output shaft 5 about the rotary axis CL.

The friction material 5b is adhered to a front surface of the driven plate 5a. Hence, when the drive plate 2a contacts the friction material 5b on the driven plate 5a, power transmission from the input shaft 2 side to the output shaft 5 side is caused to occur by frictional resistance.

The clutch piston 3 is provided to be capable of sliding relative to the input shaft 2 and drive plates 2a in the direction of the rotary axis CL. Further, a hydraulic chamber 8 is formed on one end surface side of the clutch piston 3. The clutch piston 3 is pressed so as to slide in the rotary axis CL direction by an oil pressure of working oil supplied to the hydraulic chamber 8 via a working oil passage 9.

In this embodiment, the clutch piston 3 is set to move further toward the drive plate 2a side (a direction A in FIG. 1) as the magnitude of the oil pressure of the supplied working oil increases. Further, when the clutch piston 3 impinges on the drive plate 2a, the drive plate 2a is pressed in the direction A of FIG. 1 in accordance with the magnitude of the oil pressure of the working oil.

Further, the return spring 4 is interposed between the clutch piston 3 and the input shaft 2 such that the clutch piston 3 is biased in a direction B of FIG. 1. In this embodiment, a biasing force of the return spring 4 is set such that a clearance (gap) of a predetermined distance d is maintained between the clutch piston 3 and the drive plate 2a when the oil pressure of the working oil supplied through the working oil passage 9 is lower than a first predetermined pressure. The predetermined distance d is a separation distance between the clutch piston 3 and the drive plate 2a when the clutch piston 3 has slid as far as possible in the direction B of FIG. 1.

In other words, when power is not to be transmitted from the input shaft 2 side to the output shaft 5 side, the oil pressure of the working oil is reduced below the first predetermined pressure, whereby the clutch piston 3 is biased in the direction B of FIG. 1 by the biasing force of the return spring 4 such that a clearance having the predetermined distance d can be provided between the clutch piston 3 and the drive plate 2a.

Here, the position of the clutch piston 3 when a gap having the predetermined distance d is maintained as the clearance between the clutch piston 3 and the drive plate 2a, will be referred to hereafter as a reference position, and movement of the clutch piston 3 in the direction of the drive plate 2a (the direction A in FIG. 1) will be referred to as a stroke. Further, a load of the return spring 4 in the reference position will be referred to as a return spring set load. Furthermore, when the stroke of the clutch piston 3 is zero, the clearance to the drive plate 2a corresponds to the predetermined distance d. When the stroke equals d, the clutch piston 3 contacts the drive plate 2a, whereby a so-called half clutch state (a clutch slip state) is achieved such that power transmission from the input shaft 2 side to the output shaft 5 side begins.

The clutch control device of this embodiment is applied to the friction clutch mechanism 1 described above. The clutch control device is constituted by an oil pressure adjustment device 7 that adjusts the oil pressure of the working oil supplied to the hydraulic chamber 8, an oil pressure sensor 6 that detects the magnitude of the oil pressure of the working oil flowing through the working oil passage 9, and an electronic control device (ECU) 10 that controls the oil pressure adjustment device 7. Although not shown in the figure, the working oil flowing through the working oil passage 9 is supplied from a hydraulic pump (not shown).

The oil pressure adjustment device 7 includes a solenoid valve serving as a control valve for adjusting the oil pressure of the working oil supplied to the hydraulic chamber 8 through the working oil passage 9, and is used to control a working oil supply from the hydraulic pump on the basis of an oil pressure control signal (command value) from the ECU 10 such that the oil pressure of the working oil supplied to the hydraulic chamber 8 can be increased and decreased.

The oil pressure sensor 6 is interposed on the working oil passage 9 in the vicinity of the clutch piston 3, and is used to detect the oil pressure magnitude (in other words, an actual oil pressure) of the working oil acting on the clutch piston 3 and output the detected actual oil pressure to the ECU 10.

It should be noted that the actual oil pressure is the magnitude of the oil pressure that actually acts on the clutch piston 3, and not the magnitude of the oil pressure adjusted by the oil pressure adjustment device 7. In a steady state where the clutch piston 3 is immobile, the magnitude of the oil pressure adjusted by the oil pressure adjustment device 7 is detected by the oil pressure sensor 6, whereas in a non-steady state where the clutch piston 3 is mobile, an oil pressure having a different value to the oil pressure adjusted by the oil pressure adjustment device 7 is detected in the oil pressure sensor 6.

Next, various internal control units (control function elements) of the ECU 10 will be described. The ECU 10 is constituted by a central processing unit (CPU), a random access memory (RAM), a read-only memory (ROM), an input/output interface, and so on. The ECU 10 is provided with a base oil pressure command unit 11 that outputs a basic oil pressure signal, a cycle oil pressure command unit (applying means) 12 that outputs an auxiliary oil pressure signal, an oil pressure command unit 14 that controls the oil pressure adjustment device 7 in accordance with the oil pressure signals, a stroke determination unit (stroke determining means) 13 that determines a stroke of the clutch piston 3, a learning unit (learning means) 15 that learns the determined stroke, and a storage unit (storage means) 16 that stores the learned content, as function elements.

Figure 2:
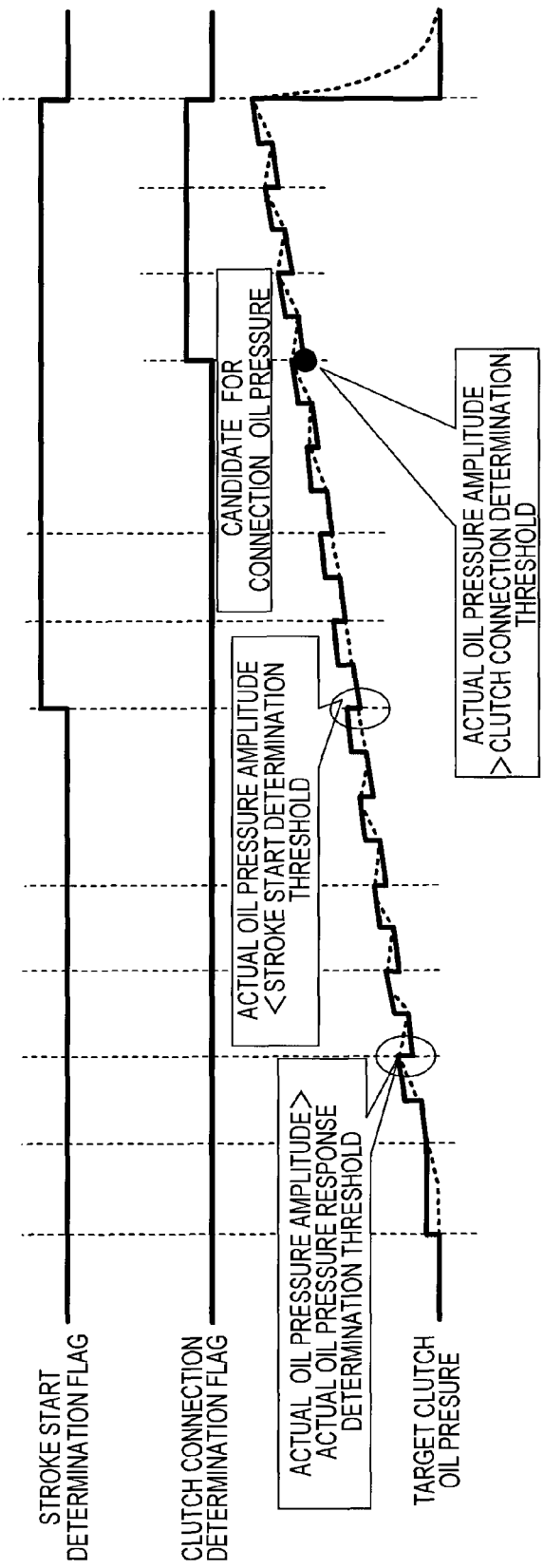
FIG. 2 is a time chart showing a target oil pressure (command oil pressure) (solid line) and an actual oil pressure (dotted line) when a piston of a clutch is driven according to this invention.

The oil pressure command unit 14 functions to adjust the oil pressure of the working oil supplied to the hydraulic chamber 8 by outputting a command oil pressure (a value proportionate to an electric current command value issued to the solenoid valve) to the oil pressure adjustment device 7 in accordance with the magnitude of the oil pressure signals input by the base oil pressure command unit 11 and cycle oil pressure command unit 12 in order to control the oil pressure adjustment device 7. Temporal variation in the command oil pressure is shown by a solid line in FIG. 2.

The base oil pressure command unit 11 has a function for outputting the basic oil pressure signal to the oil pressure command unit 14. The basic oil pressure signal is an oil pressure signal used for detecting the stroke of the clutch piston 3, the value of which increases gradually over time.

Meanwhile, the cycle oil pressure command unit (applying means) 12 has a function for outputting the auxiliary oil pressure signal (wave signal) to the oil pressure command unit 14. The auxiliary oil pressure signal is also an oil pressure signal used for detecting the stroke of the clutch piston 3, and takes the form of a pulse signal having a predetermined period and a predetermined amplitude. Although a pulse signal is used in this embodiment, an alternating current signal which varies such that a current value and a voltage value thereof draw a sine curve, for example, may be used.

The pulse signal output from the cycle oil pressure command unit 12 is applied to the basic oil pressure signal output from the base oil pressure command unit 11, whereupon control of the oil pressure adjustment device 7 is implemented by the oil pressure command unit 14 in accordance with an oil pressure signal obtained by adding together the basic oil pressure signal and the pulse signal. The amplitude of the pulse signal is set such that it can be detected by the oil pressure sensor 6, and is set to be considerably smaller than that of the basic oil pressure signal. Thus, the pulse signal does not cause a driver to experience an unpleasant sensation.

The stroke determination unit (stroke determining means) 13 determines the stroke of the clutch piston 3 on the basis of a variation amount in the magnitude of the actual oil pressure input from the oil pressure sensor 6 and a variation width of the pulse signal commanded by the cycle oil pressure command unit 12 (in other words, the amplitude of the command oil pressure).

First, as described in JP2006-336806A, published by the Japan Patent Office in 2006, the stroke determination unit 13 calculates a variation Pa in the magnitude of the actual oil pressure detected by the oil pressure sensor 6 and an oil pressure magnitude Pb corresponding to the amplitude of the pulse signal from the cycle oil pressure command unit 12. Next, the stroke determination unit 13 calculates an oil pressure variation ratio (Pa/Pb) between the amplitude of the actual oil pressure (variation in the magnitude of the actual oil pressure) Pa and the amplitude of the command oil pressure (variation in the oil pressure defined by the pulse signal) Pb. When the oil pressure variation ratio (Pa/Pb) is smaller than a first predetermined ratio H1, which is smaller than a preset value of 1, the stroke determination unit 13 determines that the stroke of clutch piston 3 has begun. In accordance with the transmission characteristic of the actual oil pressure of the working oil, the variation Pa in the actual oil pressure detected by the oil pressure sensor 6 decreases during the stroke of the clutch piston 3, and therefore the oil pressure variation ratio decreases greatly. Further, when the oil pressure variation ratio increases again so as to reach or exceed a second predetermined ratio H2 (where H1<H2<1), the stroke determination unit 13 determines that the stroke of the clutch piston 3 is complete. The amplitude of the actual oil pressure can be detected by means of a normal method, i.e. by extracting an oscillation component (alternating current component) of the actual oil pressure signal output by the oil pressure sensor 6 in a hardware or software constitution using an electric circuit, a Fourier transform, or similar.

When the stroke determination unit 13 determines that the stroke of the clutch piston 3 is complete, the oil pressure command unit 14 is caused to terminate control of the oil pressure adjustment device 7.

From the determination result of the stroke determination unit 13, the learning unit (learning means) 15 learns the command oil pressure input into the oil pressure adjustment device 7 at the start and end of the stroke or a value obtained by removing an oscillation component (a part corresponding to the wave signal) from the command oil pressure. The learned command oil pressure at the start of the stroke (stroke start command oil pressure) and the learned command oil pressure at the end of the stroke (stroke end command oil pressure) are stored in the storage unit 16 and referred to for use when start-up control and shift control are implemented in the friction clutch mechanism 1.

It should be noted that this series of control processes executed by the ECU 10 from issuance of the oil pressure command to learning will be referred to as learning control.

Further, a condition for performing learning (a learning condition) is set in the learning unit 15 to improve the learning precision of the learning control. Here, the learning condition is satisfied when the stroke start command oil pressure is within an appropriate range (corresponding to a step S2 to be described below) and when the stroke end command oil pressure is within an appropriate range (corresponding to a step S5 to be described below). When the stroke start command oil pressure and stroke end command oil pressure are both within their respective appropriate ranges, the stroke end command oil pressure is learned.

The appropriate range of the stroke end command oil pressure and the appropriate range of the stroke start command oil pressure will now be described.

First, a design value $P_{set}$ of a stroke end actual oil pressure is expressed by the following Formula (1).

$$P_{set} = P_0 + kd \quad (1)$$

Here, $P_0$ is a design value of the return spring set load (represented here by a pressure obtained by dividing the load of the return spring 4 by a piston sectional area), k is a value obtained by dividing a spring constant of the return spring by the piston sectional area, and d is a design value of the clearance. The piston sectional area is the sectional area of a perpendicular piston cross-section to the rotary axis CL.

A stroke end command oil pressure $P_{com}$ taking into account variation in the return spring set load and variation in the clearance is expressed by the following Formula (2).

$$P_{com} = (P_0 + \Delta P_0) + k(d + \Delta d) \quad (2)$$

Here, $\Delta P_0$ is a deviation from the set value of the return spring set load, and $\Delta d$ is a deviation from the set value of the clearance.

Accordingly, a stroke end command oil pressure $P_{fin}$ is expressed by the following formula (3A) or (3B).

$$\begin{aligned}
P_{fin} &= (1 + \Delta\alpha)P_{com} + \Delta\beta \quad &(3A)\\
&= \{(P_0 + \Delta P_0) + k(d + \Delta d)\}(1 + \Delta\alpha) + \Delta\beta\\
&= \{(P_0 + \Delta P_0) + k(d + \Delta d)\} +\\
&\quad \Delta\alpha\{(P_0 + \Delta P_0) + k(d + \Delta d)\} + \Delta\beta\\
&\approx (P_0 + \Delta P_0) + k(d + \Delta d) + \Delta\alpha(P_0 + kd) + \Delta\beta\\
&= P_{set} + (\Delta P_0 + k\Delta d + \Delta\alpha P_{set} + \Delta\beta) \quad &(3B)
\end{aligned}$$

Here, $\Delta\alpha$ is a deviation of a proportional factor of a solenoid valve characteristic (a relationship between the command oil pressure and the actual oil pressure) from 1, and $\Delta\beta$ is an offset of the solenoid valve characteristic. In an ideal state, the stroke end command oil pressure $P_{fin}$ is equal to $P_{com}$ ($P_{fin}=P_{com}$), but in actuality, a deviation occurs therebetween such that $P_{fin}=(1+\Delta\alpha) P_{com}+\Delta\beta$. The deviation from the ideal state is generated by deviation in the current-oil pressure characteristic of the solenoid valve and hysteresis thereof, oil temperature variation, and so on.

Hence, it can be seen that normally, four variation factors, namely the deviation from the set value of the return spring set load, the deviation from the set value of the clearance, the deviation in the proportional factor of the solenoid valve characteristic, and the offset of the solenoid valve characteristic, must be taken into account in relation to the appropriate range of the stroke end command oil pressure, as shown in Formula (3B).

An upper limit value $P_{fin}^{max}$ of the appropriate range of the stroke end command oil pressure is set as follows.

$$P_{fin}^{max} = P_{set} + (\Delta P_0^{max} + k\Delta d^{max} + \Delta\alpha^{max} P_{set} + \Delta\beta^{max})$$

Here, maximum values $\Delta P_0^{max}$, $\Delta d^{max}$, $\Delta\alpha^{max}$ of the respective deviations and a maximum value $\Delta\beta^{max}$ of the offset are normally larger than zero ($\Delta P_0^{max}$, $\Delta d^{max}$, $\Delta\alpha^{max}$, $\Delta\beta^{max}>0$).

Similarly, a lower limit value $P_{fin}^{min}$ of the appropriate range of the stroke end command oil pressure is set as follows.

$$P_{fin}^{min} = P_{set} + (\Delta P_0^{min} + k\Delta d^{min} + \Delta\alpha^{min} P_{set} + \Delta\beta^{min})$$

Here, minimum values $\Delta P_0^{min}$, $\Delta d^{min}$, $\Delta\alpha^{min}$ of the respective deviations and a minimum value $\Delta\beta^{min}$ of the offset are normally smaller than zero ($\Delta P_0^{min}$, $\Delta d^{min}$, $\Delta\alpha^{min}$, $\Delta\beta^{min}<0$; it should be noted that normally, $\Delta P_0^{min}=-\Delta P_0^{max}$ and $\Delta d^{min}=-\Delta d^{max}$).

The maximum value and minimum value $\Delta P_0^{max}$, $\Delta P_0^{min}$ of the deviation in the return spring set load are determined in advance as tolerances when incorporating the return spring into the clutch. The maximum value and minimum value $\Delta d^{max}$, $\Delta d^{min}$ of the deviation from the set value of the clearance are also determined in advance as tolerances. The maximum value $\Delta\alpha^{max}$ and minimum value $\Delta\alpha^{min}$ of the deviation of the proportional factor of the solenoid valve characteristic and the maximum value $\Delta\beta^{max}$ and minimum value $\Delta\beta^{min}$ of the offset are determined in advance through experiment or the like.

Hence, a variation width $\Delta P_{fin}$ of the stroke end command oil pressure is expressed by the following Formula (4).

$$\Delta P_{fin} = P_{fin}^{max} - P_{fin}^{min} = (\Delta P_0^{max} - \Delta P_0^{min}) + k(\Delta d^{max} - \Delta d^{min}) + (\Delta\alpha^{max} - \Delta\alpha^{min})P_{set} + (\Delta\beta^{max} - \Delta\beta^{min}) \quad (4)$$

Likewise with regard to the appropriate range of the stroke start command oil pressure, a stroke start command oil pressure $P_{start}$ is obtained by removing the items $k(d+\Delta d)$ and $kd$ generated by the stroke of the piston from Formula (3A) such that the following Formula (5) is obtained.

$$P_{start}=(P_0+\Delta P_0)+\Delta\alpha P_0+\Delta\beta \quad (5)$$

Hence, three variation factors, namely the deviation from the set value of the return spring set load, the deviation in the proportional factor of the solenoid valve characteristic, and the offset of the solenoid valve characteristic, must be taken into account in relation to the stroke start command oil pressure.

An upper limit value $P_{start}^{max}$ of the appropriate range of the stroke start command oil pressure is set as follows.

$$P_{start}^{max}=(P_0+\Delta P_0^{max})+\Delta\alpha^{max}P_0+\Delta\beta^{max}$$

Similarly, a lower limit value $P_{start}^{min}$ of the appropriate range of the stroke start command oil pressure is set as follows.

$$P_{start}^{min}=(P_0+\Delta P_0^{min})+\Delta\alpha^{min}P_0+\Delta\beta^{min}$$

Further, a variation width of the stroke start command oil pressure is expressed by the following Formula (6).

$$\Delta P_{start}=P_{start}^{max}-P_{start}^{min}=(\Delta P_0^{max}-\Delta P_0^{min})+(\Delta\alpha^{max}-\Delta\alpha^{min})P_0+(\Delta\beta^{max}-\Delta\beta^{min}) \quad (6)$$

From Formula (3A) and Formula (5), the following Formula (7) is obtained.

$$P_{fin}=P_{start}+k(d+\Delta d)+kd\Delta\alpha=P_{start}+kd+k\Delta d+kd\,\Delta\alpha \quad (7)$$

In this embodiment, the stroke end command oil pressure $P_{fin}$ can be estimated on the basis of the stroke start command oil pressure $P_{start}$, as shown in Formula (7). Therefore, in contrast to the typical case shown in Formula (3B), the appropriate range of the stroke end command oil pressure can be determined taking into consideration only two variation factors (variation in the proportional factor and variation in the clearance).

In this embodiment, an upper limit value D of the appropriate range of the stroke end command oil pressure is calculated as shown in the following Formula (8).

$$D=P_{fin}^{max}=P_{start}+k(d+\Delta d^{max})+kd\Delta\alpha^{max}=P_{start}+kd+k\Delta d^{max}+kd\Delta\alpha^{max} \quad (8)$$

Hence, the upper limit value D is calculated on the basis of the measured stroke start command oil pressure $P_{start}$ from the value k obtained by dividing the spring constant of the return spring by the piston sectional area, the design value d of the clearance, the maximum value $\Delta d^{max}$ of the deviation from the set value of the clearance, and the maximum value $\Delta\alpha^{max}$ of the deviation in the proportional factor of the solenoid valve characteristic, taking into account only two variation factors, namely the deviation of the proportional factor and the deviation of the clearance.

Furthermore, in this embodiment, a lower limit value C of the appropriate range of the stroke end command oil pressure is calculated as shown in the following Formula (9).

$$C=P_{fin}^{min}=P_{start}+k(d+\Delta d^{min})+kd\Delta\alpha^{min}=P_{start}+kd+k\Delta d^{min}+kd\Delta\alpha^{min} \quad (9)$$

Hence, the lower limit value C is calculated on the basis of the measured stroke start command oil pressure $P_{start}$ from the value k obtained by dividing the spring constant of the return spring by the piston sectional area, the design value d of the clearance, the minimum value $\Delta d^{min}$ of the deviation from the set value of the clearance, and the minimum value $\Delta\alpha^{min}$ of the deviation in the proportional factor of the solenoid valve characteristic, taking into account only two variation factors, namely the deviation of the proportional factor and the deviation of the clearance.

In this case, the variation width $\Delta P_{fin}$ of the stroke end command oil pressure is expressed by the following Formula (10).

$$\Delta P_{fin}=P_{fin}^{max}-P_{fin}^{min}=k(\Delta d^{max}-\Delta d^{min})+kd(\Delta\alpha^{max}-\Delta\alpha^{min}) \quad (10)$$

Hence, in this embodiment, the stroke end command oil pressure $P_{fin}$ is estimated on the basis of the stroke start command oil pressure $P_{start}$. Therefore, in contrast to the typical case shown in Formula (4), only two variation factors, namely variation in the proportional factor and variation in the clearance, need be taken into account. As a result, the appropriate range of the stroke end command oil pressure is determined with a high degree of precision, and accordingly, the learning condition becomes stricter, leading to an improvement in the accuracy of the learned value of the stroke end command oil pressure. In other words, the appropriate range of the stroke end command oil pressure is determined with a high degree of precision without the need to take into account variation from the set value of the return spring set load and variation in the offset of the solenoid valve characteristic, and therefore the precision of the learned value of the stroke end command oil pressure improves.

Further, a clutch stroke width SW is expressed by the following Formula (11) using Formula (7).

$$SW=(P_{fin}-P_{start})/k=(d+\Delta d)+d\Delta\alpha \quad (11)$$

Accordingly, an upper limit value B of an appropriate range of the clutch stroke width SW is as shown in the following Formula (12).

$$B=SW^{max}=(d+\Delta d^{max})+d\Delta\alpha_{max} \quad (12)$$

Accordingly, a lower limit value A of the appropriate range of the clutch stroke width SW is as shown in the following Formula (13).

$$A=SW^{min}=(d+\Delta d^{min})+d\Delta\alpha^{min} \quad (13)$$

In this case, variation in the clutch stroke width SW is expressed by the following Formula (14).

$$\Delta SW=SW^{max}-SW^{min}=(\Delta d^{max}-\Delta d^{min})+d(\Delta\alpha^{max}-\Delta\alpha^{min}) \quad (14)$$

Hence, with regard to the clutch stroke width SW, only two variation factors, namely deviation in the proportional factor and deviation in the clearance, need be taken into account. Therefore, similarly to the stroke end command oil pressure, the appropriate range of the clutch stroke width is determined with a high degree of precision. Accordingly, when a learning condition relating to the clutch stroke width SW is used, the learning condition of the stroke end command oil pressure becomes stricter, and therefore the accuracy of the learned value of the stroke end command oil pressure improves. In other words, the appropriate range of the clutch stroke width is determined with a high degree of precision without the need to take into account variation from the set value of the return spring set load and variation in the offset of the solenoid valve characteristic. Therefore the precision of the learned value of the stroke end command oil pressure improves.

Figure 3:
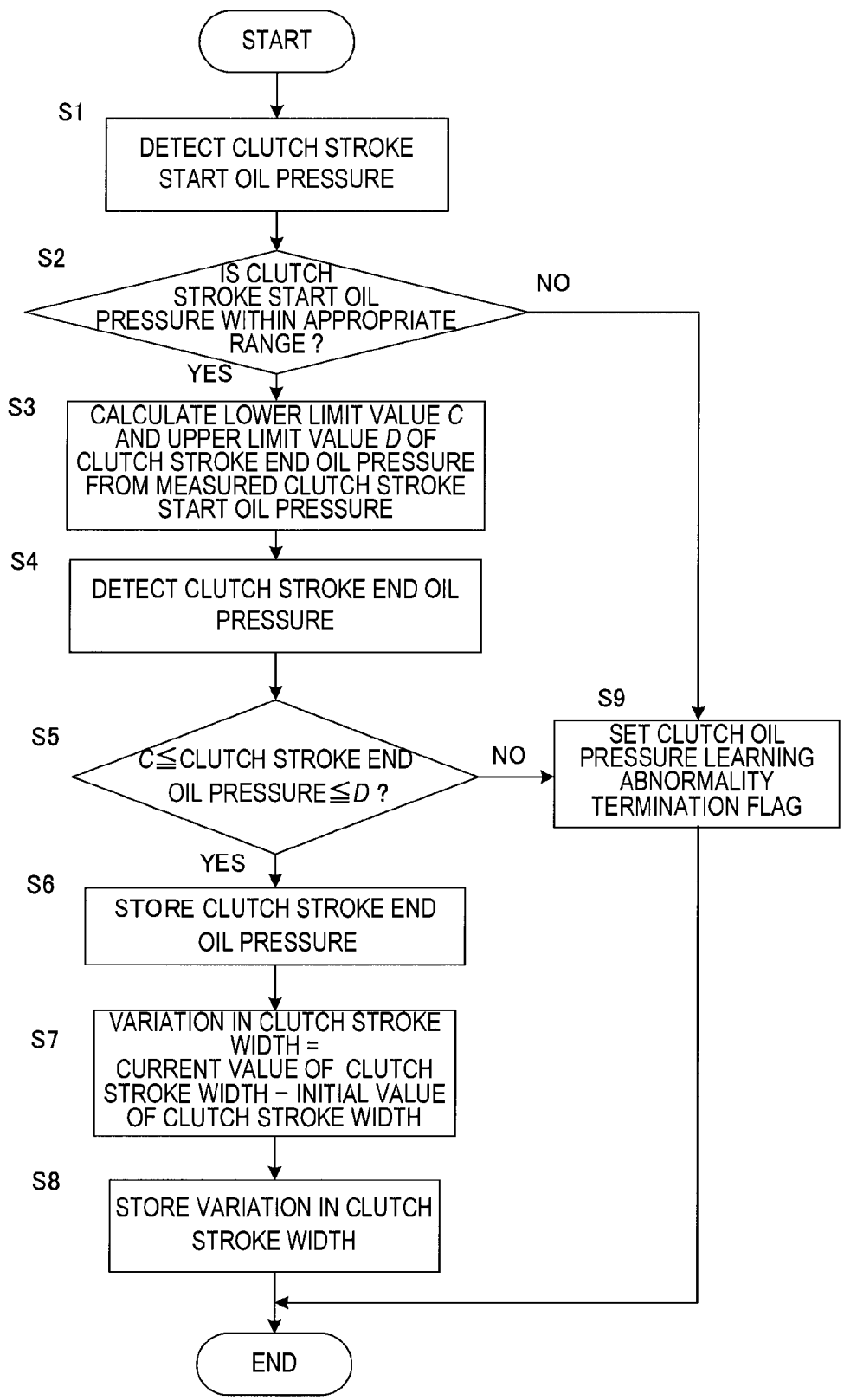
FIG. 3 is a control flowchart according to a first embodiment of this invention.

The clutch control device according to the first embodiment of this invention implements learning control in accordance with a control flowchart shown in FIG. 3. This control flow is executed repeatedly in the interior of the ECU 10 at appropriate predetermined intervals.

In a step S1, the clutch stroke start command oil pressure is detected. The detection method described above is employed such that a value obtained by removing the oscillation component (the part corresponding to the wave signal) from the command oil pressure is detected as the clutch stroke start command oil pressure, when the oil pressure variation ratio (Pa/Pb) decreases below the first predetermined ratio H1. It should be noted that if the oscillation component is small, the command oil pressure itself may be detected as the clutch stroke start command oil pressure when the oil pressure variation ratio (Pa/Pb) decreases below the first predetermined ratio H1.

In the step S2, a determination is made as to whether or not the detected clutch stroke start command oil pressure is within the appropriate range. More specifically, a determination is made as to whether or not the clutch stroke start command oil pressure $P_{start}$ is within a range extending from the predetermined maximum value $P_{start}^{max}$ and the predetermined minimum value $P_{start}^{min}$.

In a step S3, the lower limit value C and upper limit value D of the stroke end command oil pressure are calculated on the basis of the measured stroke start command oil pressure $P_{start}$ using Formulae (8) and (9).

In a step S4, the clutch stroke end command oil pressure is detected. The detection method described above is employed such that a value obtained by removing the oscillation component from the command oil pressure is detected as the clutch stroke end command oil pressure, when the oil pressure variation ratio (Pa/Pb) increases again so as to reach or exceed the second predetermined ratio H2. It should be noted that if the oscillation component is small, the command oil pressure itself may be detected as the clutch stroke end command oil pressure when the oil pressure variation ratio (Pa/Pb) reaches or exceeds the second predetermined ratio H2.

In the step S5, a determination is made as to whether or not the detected clutch stroke end command oil pressure is between the lower limit value C and the upper limit value D. When the clutch stroke end command oil pressure is smaller than the lower limit value C or larger than the upper limit value D, the clutch oil pressure learning control is terminated and a flag indicating an abnormal termination of the clutch oil pressure learning is set in a step S9. When the clutch stroke end command oil pressure is between the lower limit value C and the upper limit value D, the value of the clutch stroke end command oil pressure is determined to be normal and the routine advances to a step S6.

In the step S6, the clutch stroke end command oil pressure is stored. The clutch stroke start command oil pressure may be stored simultaneously.

In a step S7, the current clutch stroke width SW is calculated. The clutch stroke width takes a value $(P_{fin}-P_{start})/k$ that is obtained by dividing a value obtained by subtracting the clutch stroke start command oil pressure from the clutch stroke end command oil pressure by k (the value obtained by dividing the spring constant of the return spring by the piston sectional area). Variation in the clutch stroke width is determined by subtracting an initial value of the clutch stroke width from the current value of the clutch stroke width. The initial value of the clutch stroke width is a value obtained at the start of use of the clutch.

In a step S8, the variation in the clutch stroke width is stored as a clutch wear amount. When the variation in the clutch stroke width equals or exceeds a predetermined value, it is determined that wear has occurred on the clutch, and therefore appropriate processing such as indicating that the clutch is worn is executed by using an indicator or the like (not shown).

Next, a second embodiment will be described. Learning control according to the second embodiment is implemented in accordance with a flowchart shown in FIG. 4. This control flow is executed repeatedly in the interior of the ECU 10 at appropriate predetermined intervals. It should be noted that in the flowchart shown in FIG. 4, identical steps to those of the flowchart shown in FIG. 3 have been allocated identical numbers, and description thereof has been omitted.

In the second embodiment, a determination is made as to whether or not the clutch stroke width, rather than the clutch stroke end command oil pressure, is within the appropriate range. When the clutch stroke width is within the appropriate range, the clutch stroke end command oil pressure is learned because the value of the clutch stroke end command oil pressure is normal, causing the clutch stroke width to be within the appropriate range.

Figure 4:
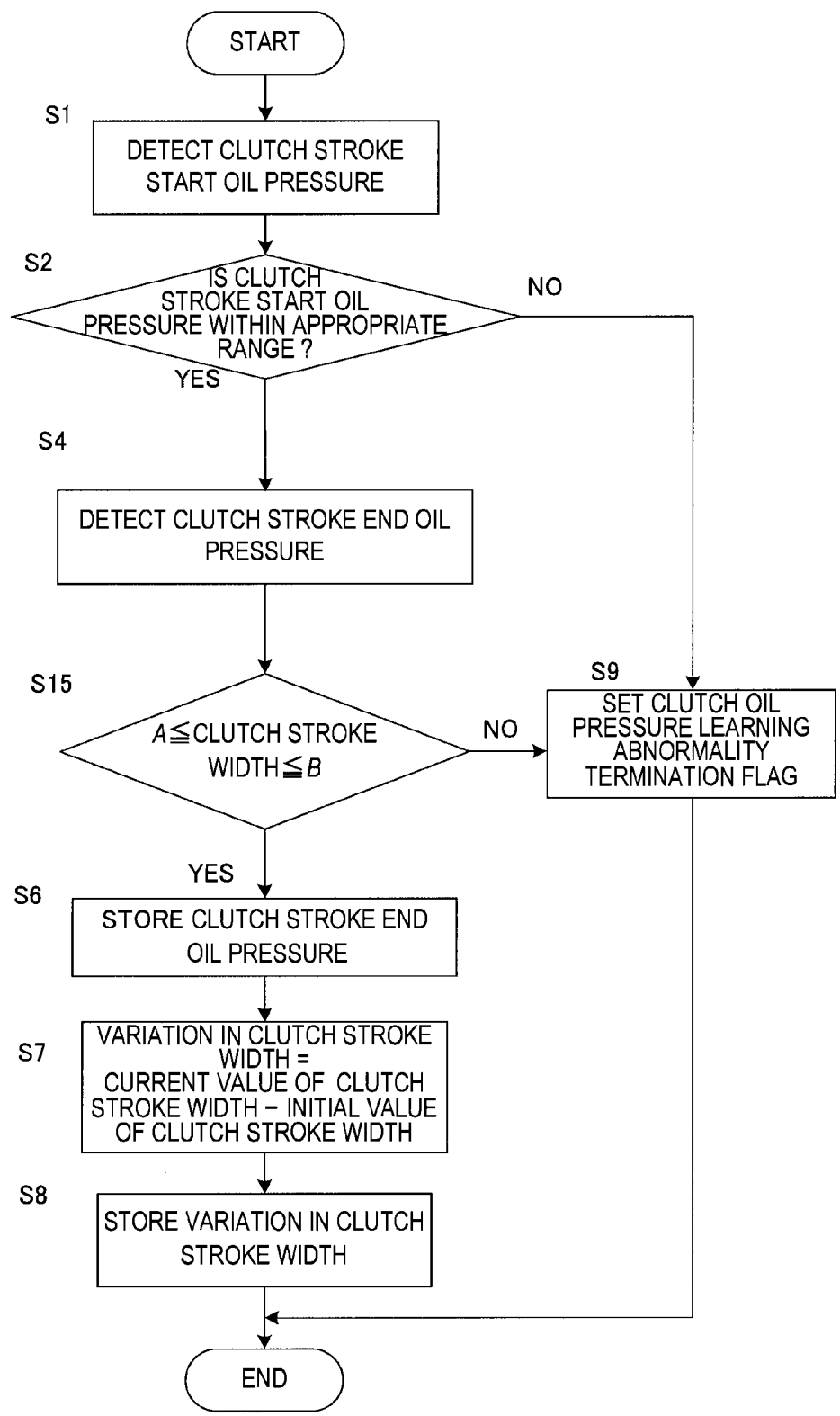
FIG. 4 is a control flowchart according to a second embodiment of this invention.

In the flowchart of FIG. 4, the step S3 of FIG. 3 is omitted, and instead, the clutch stroke width is calculated in a step S15. Here, the clutch stroke width SW takes a value $(P_{fin}-P_{start})/k$ obtained by dividing a value obtained by subtracting the clutch stroke start command oil pressure detected in the step S1 from the clutch stroke end command oil pressure detected in the step S4 by k (the value obtained by dividing the spring constant of the return spring by the piston sectional area). A determination is then made as to whether or not the clutch stroke width SW is between the lower limit value A and the upper limit value B. When the clutch stroke width SW is smaller than the lower limit value A or larger than the upper limit value B, it is determined that the clutch stroke end command oil pressure is abnormal, and therefore learning of the clutch stroke end command oil pressure is terminated and the flag indicating an abnormal termination of the clutch oil pressure learning is set in the step S9. When the clutch stroke end command oil pressure is between the lower limit value A and the upper limit value B, the routine advances to the step S6. Since the value of the clutch stroke end command oil pressure is normal causing the clutch stroke width to be within the appropriate range, the clutch stroke end command oil pressure is stored.

In the step S15, an oil pressure difference $(P_{fin}-P_{start})$ obtained by subtracting the clutch stroke start command oil pressure detected in the step S1 from the clutch stroke end command oil pressure detected in the step S4, may be determined as an index of the clutch stroke width SW and a determination may be made as to whether or not this value is between a lower limit value kA and an upper limit value kB.

This invention is not limited to the embodiments described above, and may naturally be subjected to various modifications and improvements within the scope of the technical spirit thereof.

For example, in the first and second embodiments described above, the clutch stroke start command oil pressure and stroke end command oil pressure are detected in accordance with the oil pressure variation ratio (Pa/Pb), but detection of the clutch stroke start command oil pressure and end command oil pressure is not limited thereto, and may be performed using another method (a method described in Japanese Patent No. 2595812, for example).

Further, in the above embodiments, the friction clutch mechanism 1 is described as a multiplate wet clutch, but the clutch to which the clutch control device according to the embodiments may be applied is not limited thereto, and the clutch control device may be applied to any clutch that is connected and disconnected by driving a piston using a working fluid supplied via a fluid pressure circuit, for example.

INDUSTRIAL APPLICABILITY

This invention may be used as a clutch control device and a clutch control method for a vehicle.

The invention claimed is:

1. A clutch control device that controls a clutch by driving a piston using pressure of a working fluid adjusted by a solenoid valve, the clutch including a drive plate that rotates with an input shaft and a driven plate that rotates with an output shaft, wherein the piston is configured to establish frictional contact between the drive plate and the driven plate, the clutch control device comprising:

stroke start determining means for determining that a stroke of the piston has started at a starting time and detecting a stroke start pressure at the starting time;

stroke end determining means for determining that the stroke of the piston is complete at an ending time and detecting a stroke end pressure at the ending time;

stroke end range estimating means for estimating a range of the stroke end pressure from the stroke start pressure detected by the stroke start determining means, based on at least one of a deviation of a proportional factor of a solenoid valve characteristic and a deviation from a set value of a clearance between the piston and the drive plate, wherein the solenoid valve characteristic is a relationship between a command oil pressure and an actual oil pressure; and learning means for learning the stroke end pressure detected by the stroke end determining means when the detected stroke end pressure is within the estimated range of the stroke end pressure.

2. The clutch control device as defined in claim 1, further comprising:

stroke width calculating means for calculating a stroke width of the piston from the detected stroke start pressure and the detected stroke end pressure; and wear amount calculating means for calculating a clutch wear amount from temporal variation in the stroke width calculated by the stroke width calculating means.

3. A clutch control device that controls a clutch by driving a piston using pressure of a working fluid adjusted by a solenoid valve, the clutch including a drive plate that rotates with an input shaft and a driven plate that rotates with an output shaft, wherein the piston is configured to establish frictional contact between the drive plate and the driven plate, the clutch control device comprising:

stroke start determining means for determining that a stroke of the piston has started at a starting time and detecting a stroke start pressure at the starting time;

stroke end determining means for determining that the stroke of the piston is complete at an ending time and detecting a stroke end pressure at the ending time;

clutch stroke width calculating means for calculating a clutch stroke width from the detected stroke start pressure and the detected stroke end pressure; and learning means for learning the stroke end pressure detected by the stroke end determining means when the clutch stroke width is within a predetermined range, wherein the predetermined range is determined based on at least one of a deviation of a proportional factor of a solenoid valve characteristic and a deviation from a set value of a clearance between the piston and the drive plate, and wherein the solenoid valve characteristic is a relationship between a command oil pressure and an actual oil pressure.

4. The clutch control device as defined in claim 3, further comprising wear amount calculating means for calculating a clutch wear amount from temporal variation in the clutch stroke width calculated by the clutch stroke width calculating means.

5. A clutch control method for controlling a clutch by driving a piston using pressure of a working fluid adjusted by a solenoid valve, the clutch including a drive plate that rotates with an input shaft and a driven plate that rotates with an output shaft, wherein the piston is configured to establish frictional contact between the drive plate and the driven plate, the clutch control method comprising the steps of:

determining that a stroke of the piston has started at a starting time and detecting a stroke start pressure at the starting time;

determining that the stroke of the piston is complete at an ending time and detecting a stroke end pressure at the ending time;

estimating a range of the stroke end pressure from the detected stroke start pressure, based on at least one of a deviation of a proportional factor of a solenoid valve characteristic and a deviation from a set value of a clearance between the piston and the drive plate, wherein the solenoid valve characteristic is a relationship between a command oil pressure and an actual oil pressure; and learning the detected stroke end pressure when the detected stroke end pressure is within the estimated range of the stroke end pressure.

6. A clutch control method for controlling a clutch by driving a piston using pressure of a working fluid adjusted by a solenoid valve, the clutch including a drive plate that rotates with an input shaft and a driven plate that rotates with an output shaft, wherein the driven piston is configured to establish frictional contact between the drive plate and the driven plate, the clutch control method comprising:

determining that a stroke of the piston has started at a starting time and detecting a stroke start pressure at the starting time;

determining that the stroke of the piston is complete at an ending time and detecting a stroke end pressure at the ending time;

calculating a clutch stroke width from the stroke start pressure and the stroke end pressure; and learning the detected stroke end pressure when the clutch stroke width is within a predetermined range, wherein the predetermined range is determined based on at least one of a deviation of a proportional factor of a solenoid valve characteristic and a deviation from a set value of a clearance between the piston and the drive plate, and wherein the solenoid valve characteristic is a relationship between a command oil pressure and an actual oil pressure.

7. A clutch control device that controls a clutch by driving a piston using a working fluid adjusted by a solenoid valve the clutch including a drive plate that rotates with an input shaft and a driven plate that rotates with an output shaft, wherein the driven piston is configured to establish frictional contact between the drive plate and the driven plate, the clutch control device comprising:

a pressure sensor for detecting a pressure of the working fluid;

an electric control device functioning to:

determine from the detected pressure that a stroke of the piston has started at a starting time and detect a stroke start pressure at the starting time;

determine from the detected pressure that the stroke of the piston is complete at an ending time and detect a stroke end pressure at the ending time;

estimate a range of the stroke end pressure from the detected stroke start pressure, based on at least one of a deviation of a proportional factor of a solenoid valve characteristic and a deviation from a set value of a clearance between the piston and the drive plate, wherein the solenoid valve characteristic is a relationship between a command oil pressure and an actual oil pressure; and learn the detected stroke end pressure when the detected stroke end pressure is within the estimated range of the stroke end pressure.

8. The clutch control device as defined in claim 7, wherein the electric control device functions to:

calculate a stroke width of the piston from the detected stroke start pressure and the detected stroke end pressure; and calculate a clutch wear amount from temporal variation in the stroke width.

9. A clutch control device that controls a clutch by driving a piston using a working fluid adjusted by a solenoid valve, the clutch including a drive plate that rotates with an input shaft and a driven plate that rotates with an output shaft, wherein the driven piston can establish frictional contact between the drive plate and the driven plate, the clutch control device comprising:

a pressure sensor for detecting a pressure of the working fluid; and an electric control device functioning to:

determine from the detected pressure that a stroke of the piston has started at a starting time and detect a stroke start pressure at the starting time;

determine from the detected pressure that the stroke of the piston is complete at an ending time and detect a stroke end pressure at the ending time;

calculate a clutch stroke width from the detected stroke start pressure and the detected stroke end pressure, based on at least one of a deviation of a proportional factor of a solenoid valve characteristic and a deviation from a set value of a clearance between the piston and the drive plate, wherein the solenoid valve characteristic is a relationship between a command oil pressure and an actual oil pressure; and learn the detected stroke end pressure when the clutch stroke width is within a predetermined range.

10. The clutch control device as defined in claim 9, wherein the electric control device functions to calculate a clutch wear amount from temporal variation in the clutch stroke width.

* * * * *